United States Patent [19]

Nakabayashi et al.

[11] Patent Number: 6,018,425
[45] Date of Patent: Jan. 25, 2000

[54] WIDE-ANGLE LENS ASSEMBLY AND METHOD

[75] Inventors: Koki Nakabayashi; Kazuo Ueno; Shoro Mochida, all of Neyagawa, Japan

[73] Assignee: Ishihara, Japan

[21] Appl. No.: 08/939,230

[22] Filed: Sep. 29, 1997

[30] Foreign Application Priority Data

Sep. 30, 1996 [JP] Japan ................................ 8-259466

[51] Int. Cl.⁷ .................................................. G02B 13/04
[52] U.S. Cl. ...................... 359/753; 359/716; 359/717; 359/784; 359/793
[58] Field of Search ............................ 359/749, 750, 359/751, 753, 793, 784, 790, 715–717, 682, 689, 691, 771, 763

[56] References Cited

U.S. PATENT DOCUMENTS

| | | | |
|---|---|---|---|
| 4,413,888 | 11/1983 | Sato | 359/715 |
| 5,268,792 | 12/1993 | Kreitzer | 359/689 |
| 5,473,473 | 12/1995 | Estelle | 359/691 |
| 5,485,313 | 1/1996 | Betensky | 359/689 |
| 5,646,777 | 7/1997 | Ohshita | 359/422 |

*Primary Examiner*—Scott J. Sugarman
*Assistant Examiner*—Jordan M. Schwartz
*Attorney, Agent, or Firm*—Price, Gess & Ubell

[57] ABSTRACT

A low-cost wide-angle lens assembly being comprised of a decreased number of lenses yet capable of properly correcting optical aberrations. The second lens in each lens group from the minimum to the maximum horizontal viewing angle is commonly used, and the first lens in each lens group from a reference angle to the maximum horizontal viewing angle is commonly used, thus reducing the total number of required lenses. Aberrations are favorably corrected by satisfying predetermined conditions as to focal distances and back focuses of the lenses.

3 Claims, 8 Drawing Sheets

Fig. 1

| HORIZONTAL VIEWING ANGLE | CONFIGURATION |
|---|---|
| 70° MINIMUM | |
| 80° | |
| 90° REFERENCE ANGLE | |
| 100° | |
| 110° | |
| 120° MAXIMUM | |

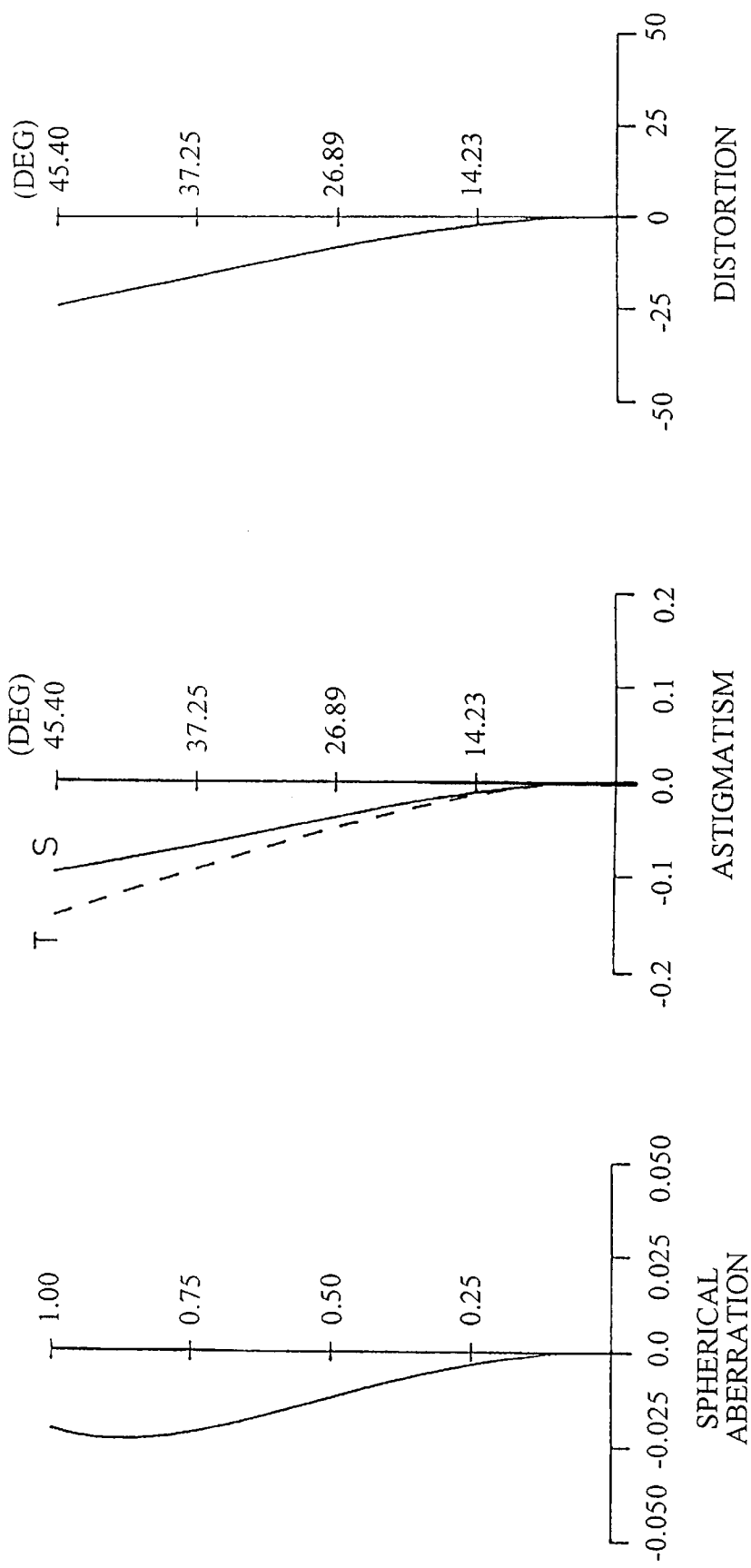

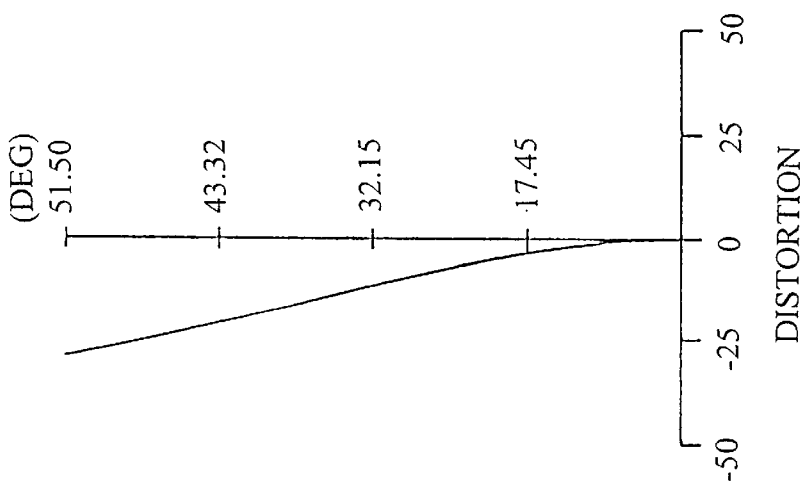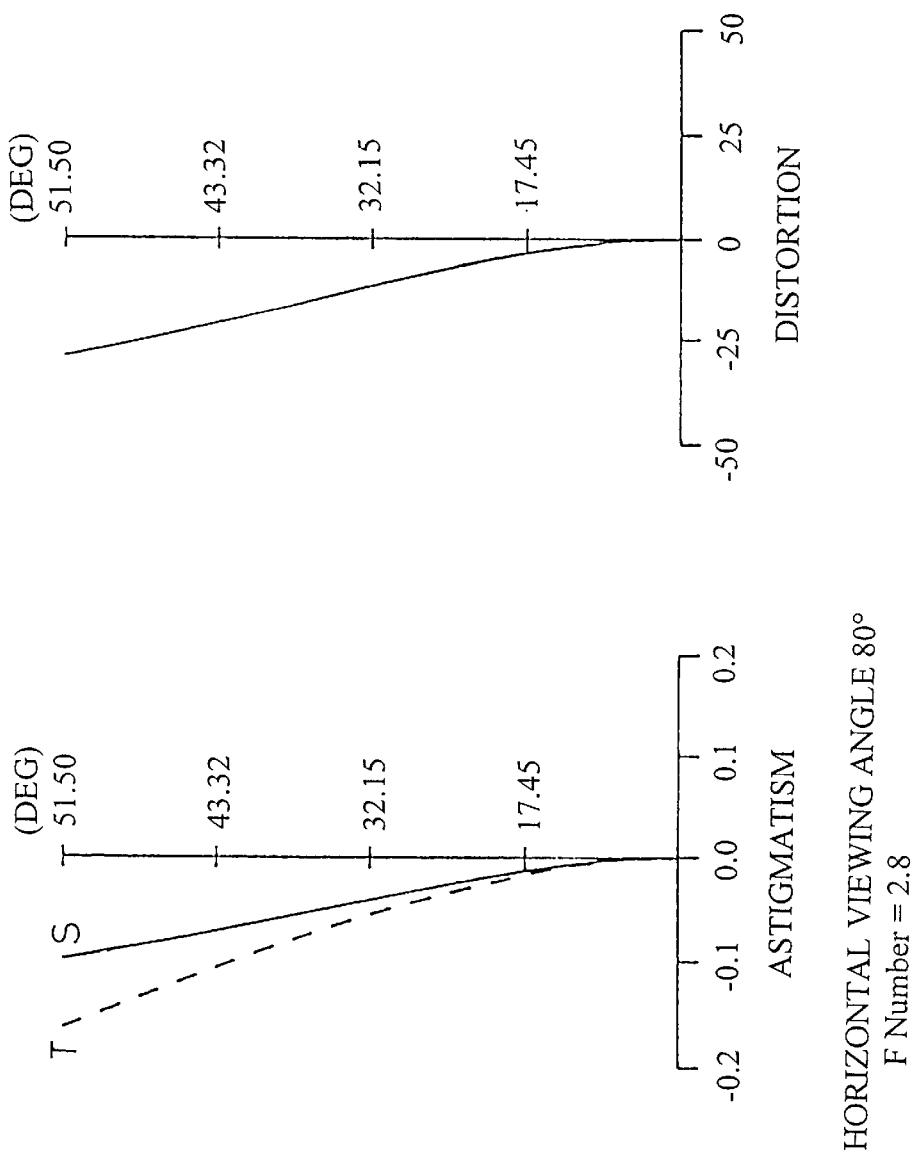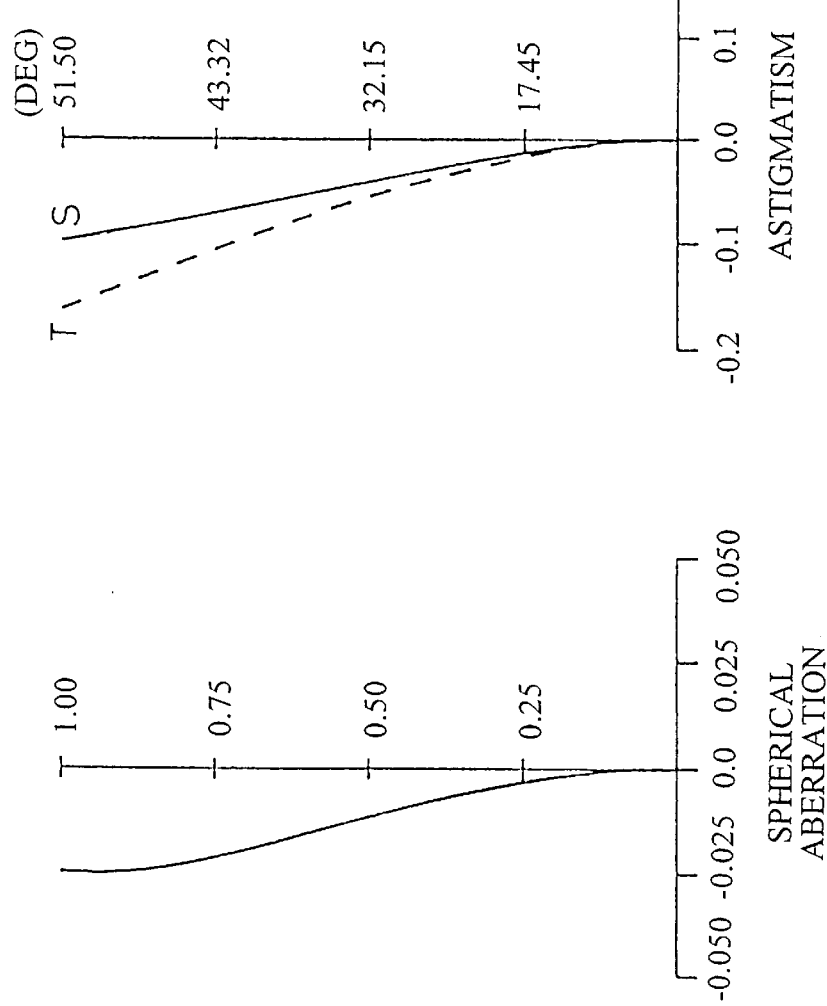

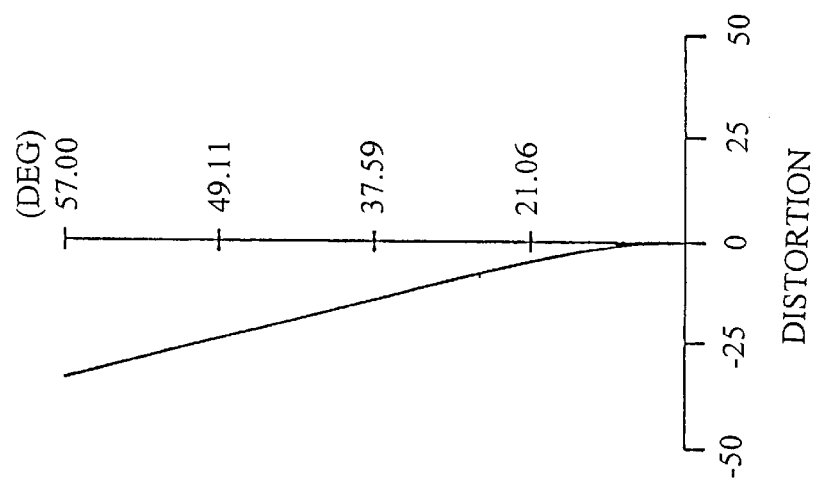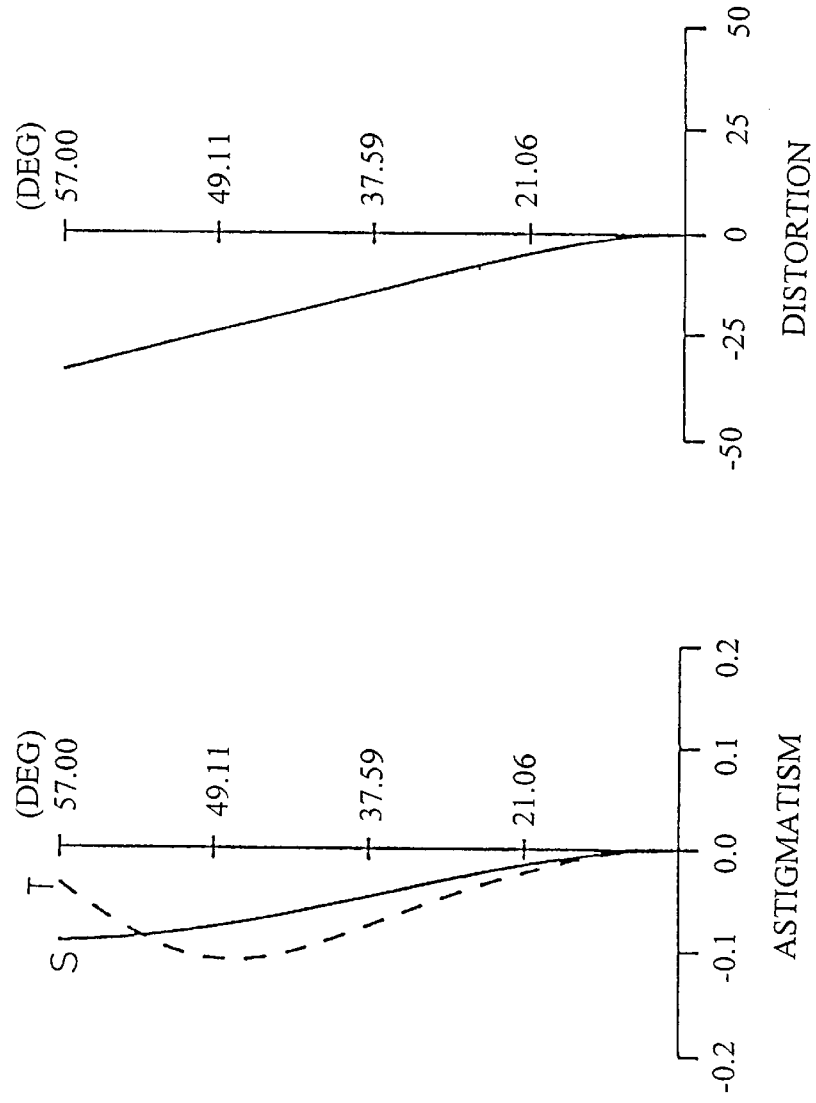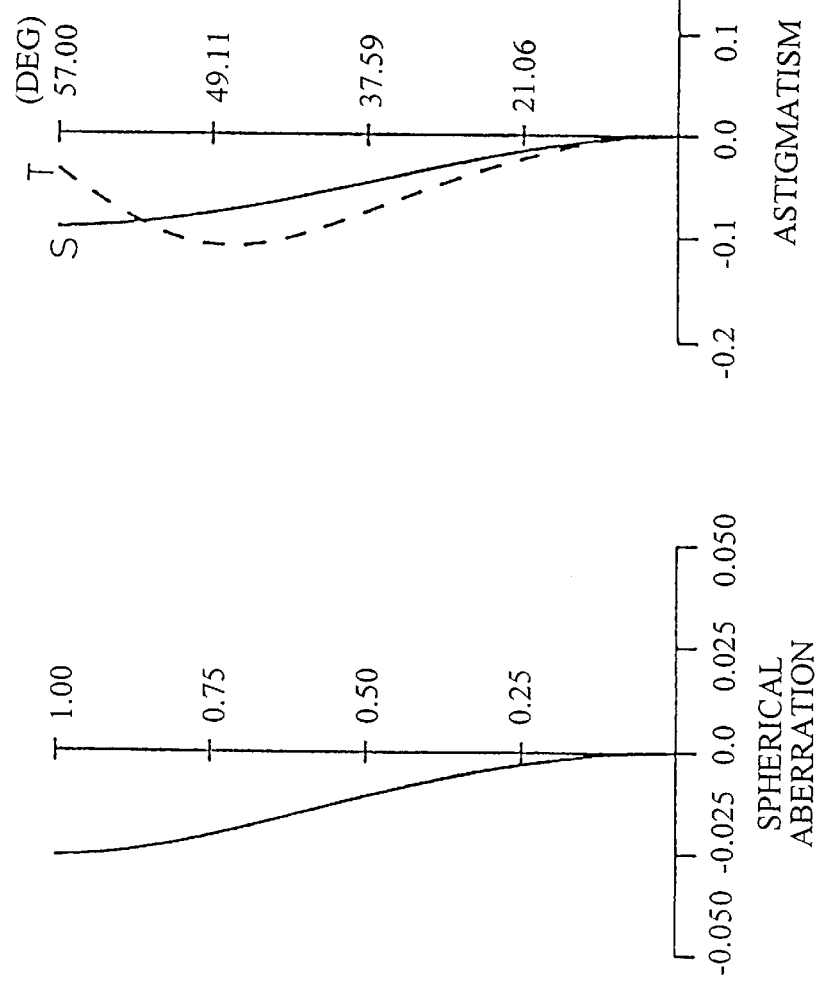

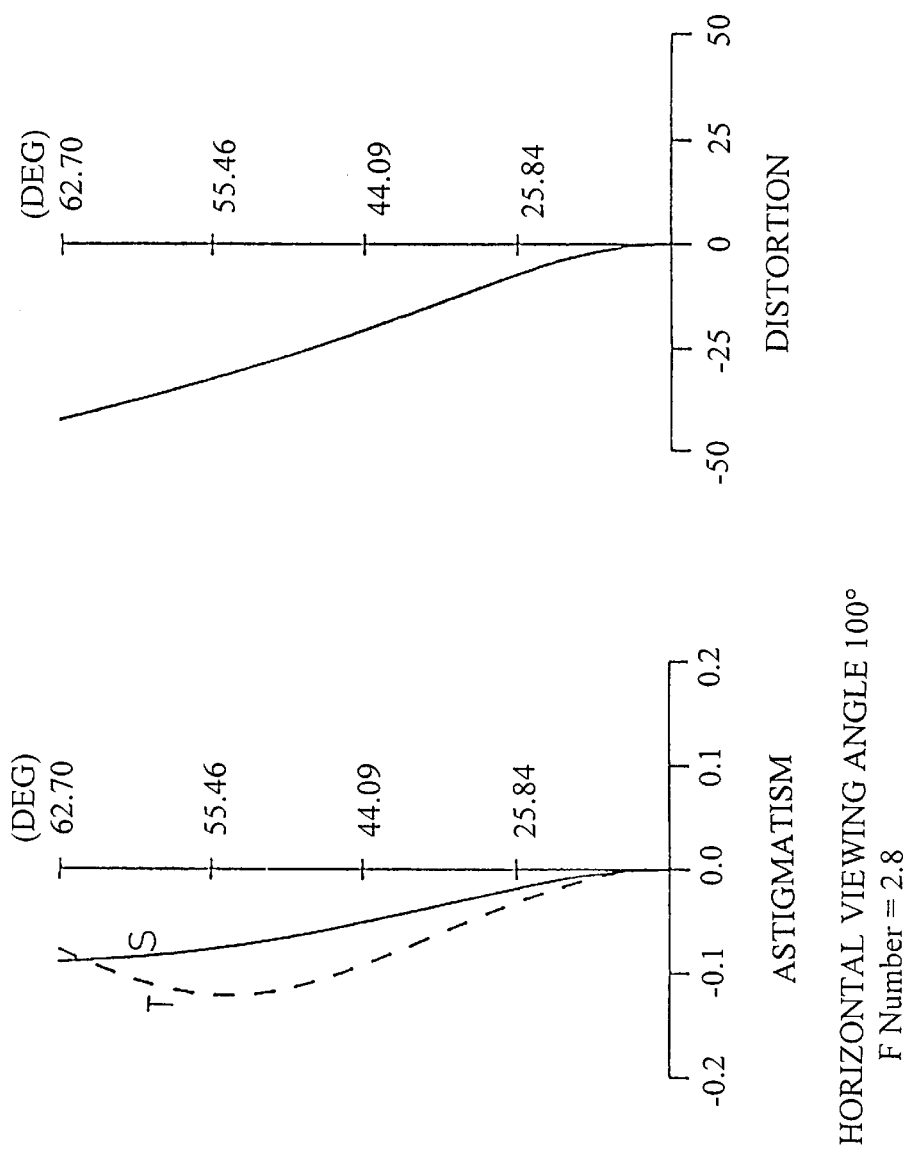

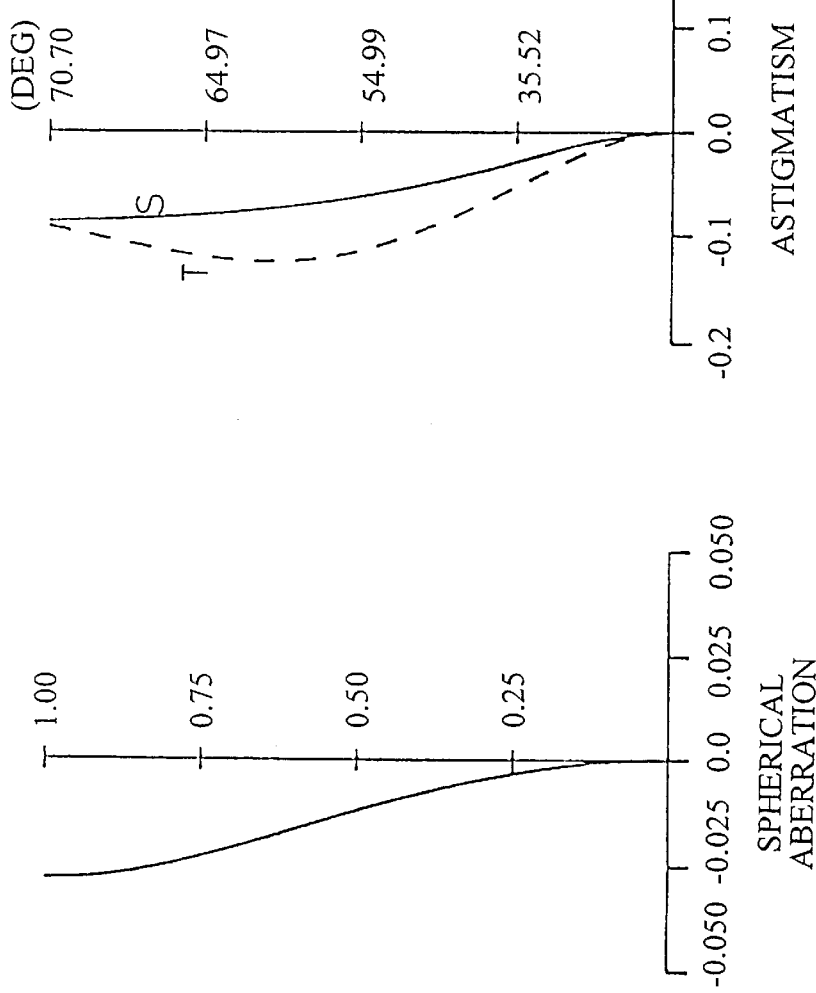
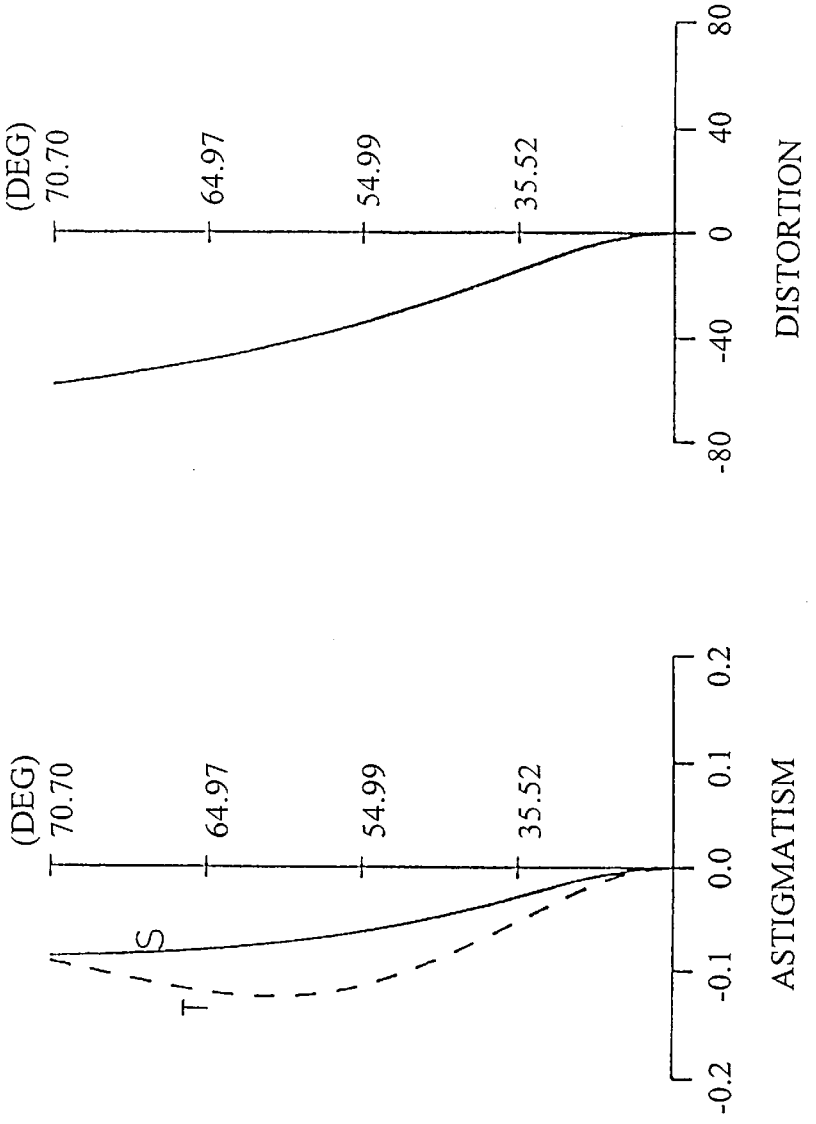
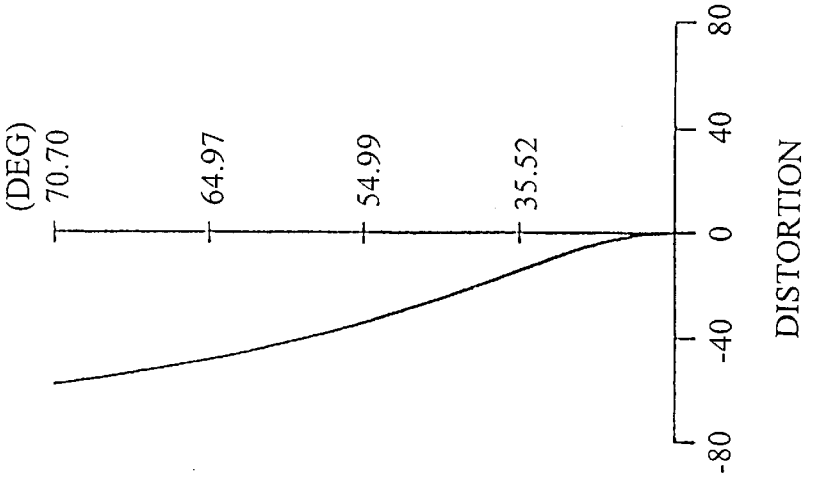

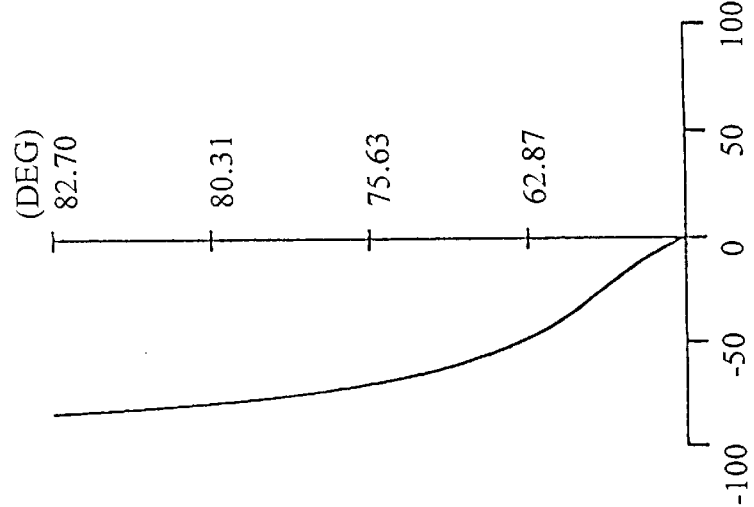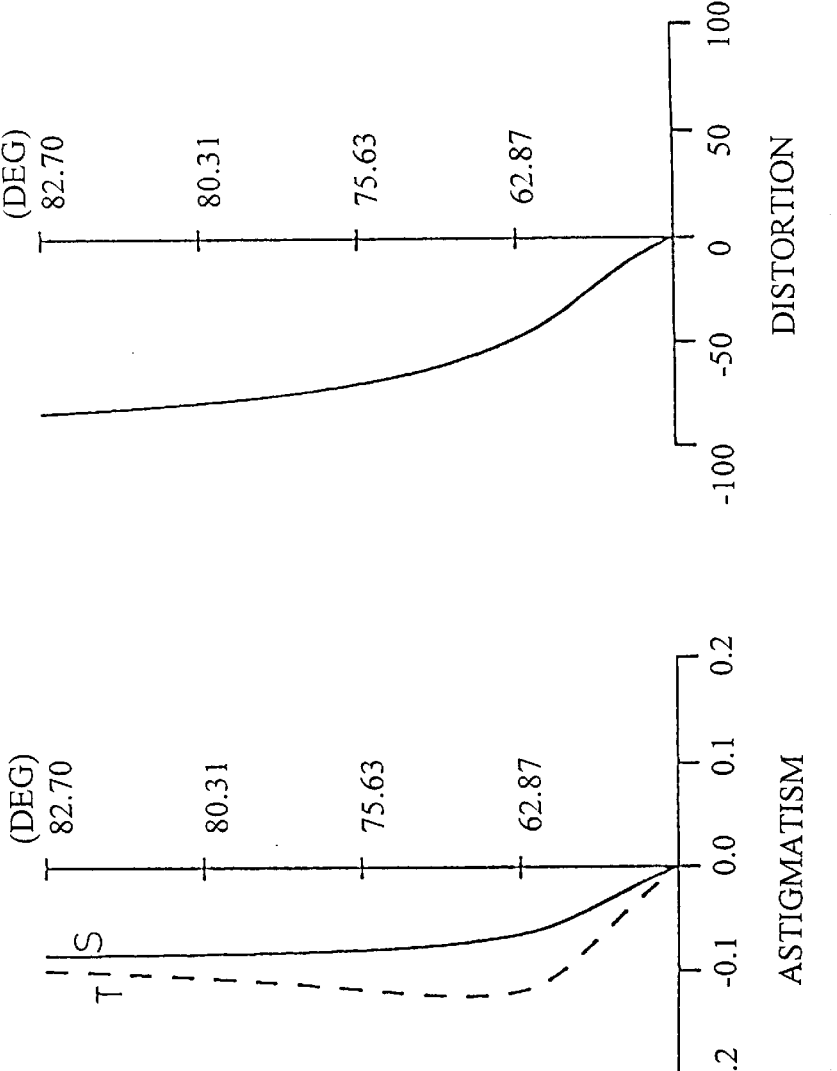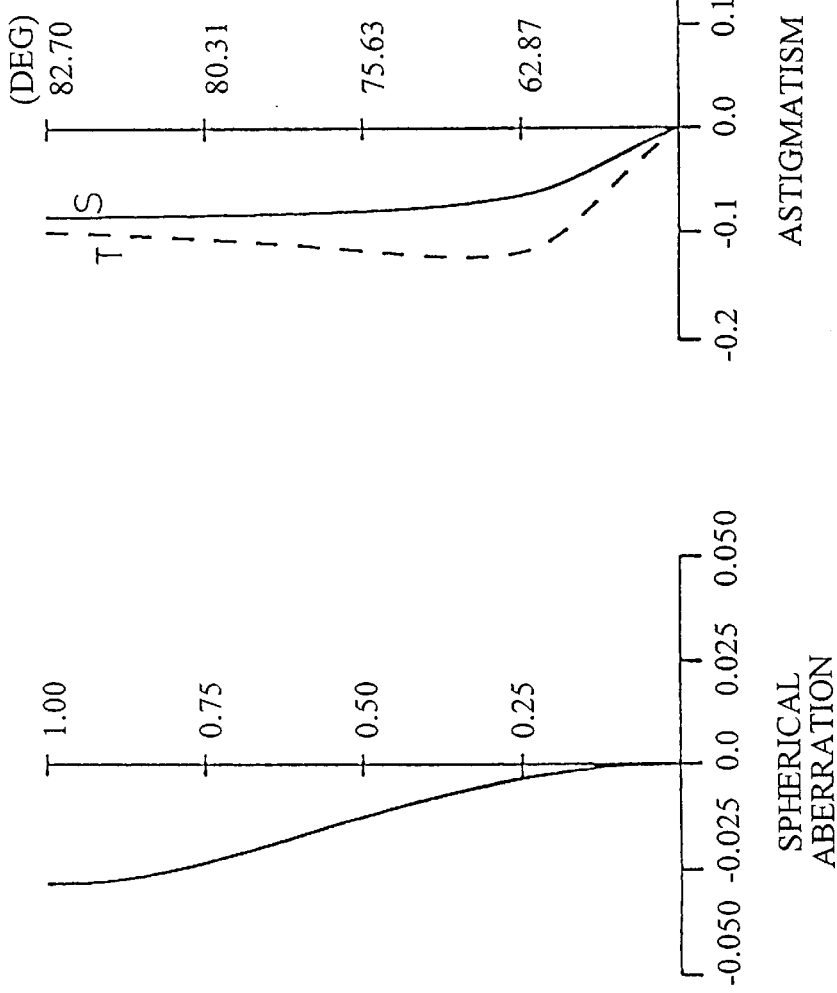

WIDE-ANGLE LENS ASSEMBLY AND METHOD

BACKGROUND OF THE INVENTION

1. Technical Field of the Invention

The present invention relates to a wide-angle lens assembly for use in a monitor camera or a vehicle-mounted camera.

2. Description of Related Art

Wide-angle lens assemblies used in a monitor camera or a vehicle-mounted camera have been desired to be less in cost and size while keeping high performance.

A conventional compact type wide-angle lens system having a 70 to 90 degrees horizontal angle of view consists of two optical lenses. Also, another compact wide-angle lens system having a horizontal viewing angle of 90 to 120 degrees consists of three optical lenses.

In order to construct six different lens groups respectively having a viewing angle of 70°, 80°, 90°, 100°, 110°, and 120° in such conventional wide-angle lens systems, it is necessary to provide a total of 15 lenses even with the use of aspherical resin lenses; two lenses for each of the viewing angles from 70° to 90° and three lenses for each of the viewing angles from 100° to 120°. The lenses have to be fabricated with different sets of molds, thus increasing the cost of production.

BRIEF SUMMARY OF THE INVENTION

It is an object of the present invention to provide a low-cost wide-angle lens assembly having fewer lenses by commonly using the same lenses yet being capable of properly correcting optical aberrations in each varying angle of view.

To accomplish the object, the present invention has a second lens commonly used in each lens group from the minimum to the maximum horizontal angle of view, and a first lens commonly used from a reference angle to the maximum horizontal viewing angle. Optical aberrations are corrected by satisfying predetermined conditions as follows:

(1) $0.65 < bf/f2 < 0.8$;

(2) $-1.8 < f1(\text{minimum})/f2 < -1.1$;

(3) $-1.8 < f1(\text{reference angle})/f2 < -1.1$;

(4) $-14.0 < f0(\text{maximum})/f2 < -5.5$;

(5) the second lens is commonly used in all lens groups; and (6) the first lens is commonly used in lens groups of horizontal viewing angles from the reference angle to the maximum angle; where f1(minimum) is a focal distance of the first lens in the lens group of the minimum horizontal viewing angle, f1(reference angle) is a focal distance of the first lens in the lens group of a reference horizontal viewing angle, f0(maximum) is a focal distance of the zeroth lens in the lens group of the maximum horizontal viewing angle, f2 is a focal length of the second lens, and bf is a back focus of each lens group.

The condition (1) is set to maintain spherical aberrations to be within a permissive range in each combination of the two-group two-lens system and the three-group three lens system.

The conditions (2) to (4) permit both spherical aberration and astigmatism to stay within their permissive range in each combination of the two-group two-lens system and the three-group three-lens system.

The condition (5) contributes to reduction of the cost for implementing both the two-group two-lens system and the three-group three-lens system. Similarly, the condition (6) contributes to reduction of the cost for implementing both the two-group two-lens system and the three-group three-lens system.

Accordingly, the wide-angle lens assembly of the present invention requires a less number of lenses yet being capable of correcting optical aberrations by satisfying these conditions (1) to (6).

Other and further objects, features and advantages of the invention will appear more fully from the following description.

BRIEF DESCRIPTION OF THE DRAWINGS

FIG. 1 is a schematic view showing one embodiment of a wide-angle lens assembly according to the present invention;

FIG. 4a–4c are diagrams showing aberrations in the wide-angle lens assembly of the viewing angle of 70°;

FIG. 5a–5c are diagrams showing aberrations in the wide-angle lens assembly of the viewing angle of 80°;

FIG. 6a–6c are diagrams showing aberrations in the wide-angle lens assembly of the viewing angle of 90°;

FIG. 7a–7c are diagrams showing aberrations in the wide-angle lens assembly of the viewing angle of 100°;

FIG. 8a–8c are diagrams showing aberrations in the wide-angle lens assembly of the viewing angle of 110°; and FIG. 9a–9c are diagrams showing aberrations in the wide-angle lens assembly of the viewing angle of 120°.

DETAILED DESCRIPTION OF PREFERRED EMBODIMENTS

A wide-angle lens assembly for a video camera according to one embodiment of the present invention will be described referring to FIGS. 1 to 9 and Tables 1 to 6.

The wide-angle lens assembly of this embodiment is designed to have different viewing angles of 70°, 80°, 90°, 100°, 110°, and 120° as shown in FIG. 1. In FIG. 1 a lens 1 serves as a second lens which is commonly used in each arrangement of the different viewing angles. A lens 4 is commonly used as a first lens in each lens group of the viewing angles of 90°, 100°, 110°, and 120°.

Figure 2:
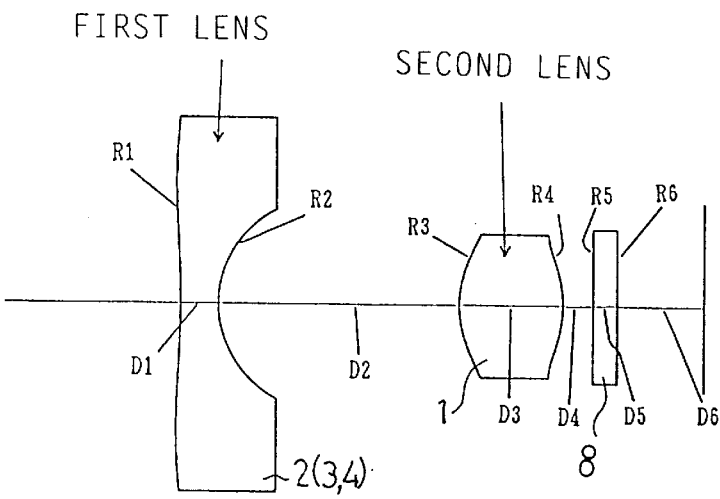
FIG. 2 is an explanatory view showing an arrangement of wide-angle lens assemblies of the viewing angles of 70° to 90°.

FIG. 2 shows the arrangement for each wide-angle lens assembly of the viewing angle of 70°, 80°, and 90°. As shown, the assembly comprises two groups of two lenses, including the first lens 2 (3,4) of a negative bi-concave lens having a convex side facing to an object side and the second lens 1 of a positive lens having a convex side facing to the object side.

Figure 3:
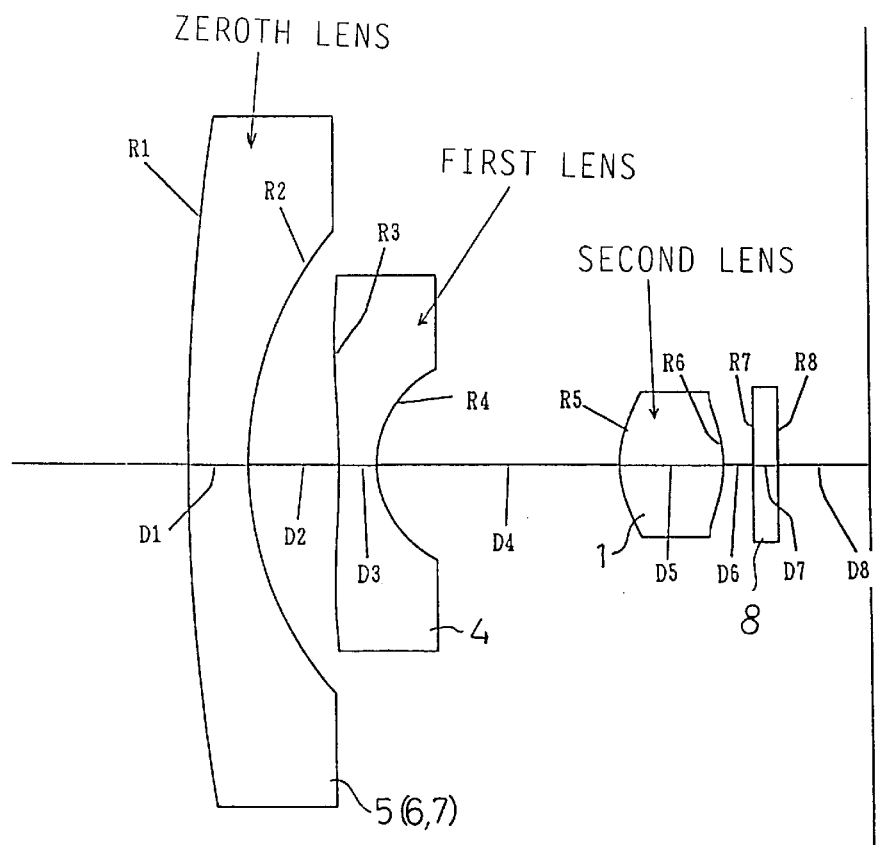
FIG. 3 is an explanatory view showing another arrangement of wide-angle lens assemblies of the viewing angle of 100° to 120°.

Similarly, FIG. 3 shows the arrangement for each wide-angle lens assembly of the viewing angle of 100°, 110°, and 120°. As shown, the assembly comprises three groups of three lenses, including a zeroth lens 5 (6,7) of a negative meniscus lens, the first lens 4 of a negative bi-concave lens, and the second lens 1 of a positive lens, all having their convex sides facing to the object side.

In FIGS. 1 to 3, the reference numeral 8 denotes a flat parallel lens located on the back side of the last lens 1, since this embodiment is designed for use in a video camera. Exemplary values of optical parameters for each wide-angle lens assembly are shown in FIGS. 2 and 3 and Tables 1 to 6, in which f is a focal distance of each lens group and F represents an F number of the lens group.

Referring to FIG. 2 and Tables 1 to 3, Ri (i=1 to 6) is the curvature radius of a lens surface of an i-th lens from the object side, Di (i=1 to 6) is the distance between the surfaces of the i-th lens and of an (i+1)th lens, and Nj (j=1 to 3) is the index of refraction of aj-th lens.

TABLE 1 f = 1.3082, F = 2.8,
Horizontal Viewing Angle = 70°, bf/f2 = 0.7852, f1/f2 = −1.4647

| | | |
|---|---|---|
| R1 = −17.10151 *1 | D1 =0.526200 | N1 = 1.526400 |
| R2 = 1.57860 | D2 = 2.411752 | |
| R3 = 1.55668 *2 | D3 = 1.512826 | N2 = 1.526400 |
| R4 = −1.74523 *3 | D4 = 0.438500 | |
| R5 = INFINITY | D5 = 0.350800 | N3 = 1.517120 |
| R6 = INFINITY | D6 = 1.457646 | |

*1 Aspherical Surface K = 0.0, A = 0.154182E-02, B = 0.166538E-03, C = −0.256626E-04
*2 Aspherical Surface K = 0.0, A = −0.379525E-01, B = −0.462606E-01, C = 0.962347E-02
*3 Aspherical Surface K = 0.0, A = 0.557427E-01, B = 0.185043E-01, C = 0.320782E-01

TABLE 2 f = 1.1398, F = 2.8,
Horizontal Viewing Angle = 80°, bf/f2 = 0.7233, f1/f2 = −1.4647

| | | |
|---|---|---|
| R1 = −17.10151 *1 | D1 =0.526200 | N1 = 1.526400 |
| R2 = 1.57860 | D2 = 2.981802 | |
| R3 = 1.55668 *2 | D3 = 1.512826 | N2 = 1.526400 |
| R4 = −1.74523 *3 | D4 = 0.438500 | |
| R5 = INFINITY | D5 = 0.350800 | N3 = 1.517120 |
| R6 = INFINITY | D6 = 1.342667 | |

*1 Aspherical Surface K = 0.0, A = 0.3913852E-02, B = 0.616809E-04, C = −0.320782E-05
*2 Aspherical Surface K = 0.0, A = −0.379525E-01, B = −0.462606E-01, C = 0.962347E-02
*3 Aspherical Surface K = 0.0, A = 0.557427E-01, B = 0.185043E-01, C = 0.320782E-01

TABLE 3 f = 1.0000, F = 2.8,
Horizontal Viewing Angle = 90°, bf/f2 = 0.6821, f1/f2 = −1.4248

| | | |
|---|---|---|
| R1 = −13.15501 *1 | D1 =0.526200 | N1 = 1.526400 |
| R2 = 1.57860 | D2 = 3.529928 | |
| R3 = 1.55668 *2 | D3 = 1.512826 | N2 = 1.526400 |
| R4 = −1.74523 *3 | D4 = 0.438500 | |
| R5 = INFINITY | D5 = 0.350800 | N3 = 1.517120 |
| R6 = INFINITY | D6 = 1.266319 | |

*1 Aspherical Surface K = 0.0, A = 0.699749E-02, B = −0.191211E-03, C = −0.121897E-04
*2 Aspherical Surface K = 0.0, A = −0.379525E-01, B = −0.462606E-01, C = 0.962347E-02
*3 Aspherical Surface K = 0.0, A = 0.557427E-01, B = 0.185043E-01, C = 0.320782E-01

Referring to FIG. 3 and Table 4 to 6, Ri (i=1 to 8) is the curvature radius of a lens surface of an i-th lens from the object side, Di (i=1 to 8) is the distance between the surfaces of the i-th lens and of an (i+1)th lens, and Nj (j=0 to 3) is the index of refraction of a j-th lens.

TABLE 4 f = 0.9113, F = 2.8,
Horizontal Viewing Angle = 100°, bf/f2 = 0.7042, f0/f2 = −12.0122

| | | |
|---|---|---|
| R1 = 10.08551 | D1 =0.877001 | N1 = 1.526400 |
| R2 = 5.26200 | D2 = 1.315501 | |
| R3 = −13.15501 *1 | D3 = 0.526200 | N2 = 1.526400 |
| R4 = 1.57860 | D4 = 3.529928 | |
| R5 = 1.55668 | D5 = 1.512826 | N3 = 1.526400 |
| R6 = −1.74523 *3 | D6 = 0.438500 | |
| R7 = INFINITY | D7 = 0.350800 | N4 = 1.517120 |
| R8 = INFINITY | D8 = 1.266319 | |

*1 Aspherical Surface K = 0.0, A = 0.699749E-02, B = −0.191211E-03, C = −0.121897E-04
*2 Aspherical Surface K = 0.0, A = −0.379525E-01, B = −0.462606E-01, C = 0.962347E-02
*3 Aspherical Surface K = 0.0, A = 0.557427E-01, B = 0.185043E-01, C = 0.320782E-01

TABLE 5 f = 0.8518, F = 2.8,
Horizontal Viewing Angle = 110°, bf/f2 = 0.7132, f0/f2 = −7.9819

| | | |
|---|---|---|
| R1 = 17.10151 | D1 =0.877001 | N1 = 1.526400 |
| R2 = 5.26200 | D2 = 1.315501 | |
| R3 = −13.15501 *1 | D3 = 0.526200 | N2 = 1.526400 |
| R4 = 1.57860 | D4 = 3.529928 | |
| R5 = 1.55668 *2 | D5 = 1.512826 | N3 = 1.526400 |
| R6 = −1.74523 *3 | D6 = 0.438500 | |
| R7 = INFINITY | D7 = 0.350800 | N4 = 1.517120 |
| R8 = INFINITY | D8 = 1.266319 | |

*1 Aspherical Surface K = 0.0, A = 0.699749E-02, B = −0.191211E-03, C = −0.121897E-04
*2 Aspherical Surface K = 0.0, A = −0.379525E-01, B = −0.462606E-01, C = 0.962347E-02
*3 Aspherical Surface K = 0.0, A = 0.557427E-01, B = 0.185043E-01, C = 0.320782E-01

TABLE 6 f = 0.8151, F = 2.8,
Horizontal Viewing Angle = 120°, bf/f2 = 0.7186, f0/f2 = −6.4814

| | | |
|---|---|---|
| R1 = 32.88752 | D1 =0.877001 | N1 = 1.526400 |
| R2 = 5.26200 | D2 = 1.315501 | |
| R3 = −13.15501 *1 | D3 = 0.526200 | N2 = 1.526400 |
| R4 = 1.57860 | D4 = 3.529928 | |
| R5 = 1.55668 *2 | D5 = 1.512826 | N3 = 1.526400 |
| R6 = −1.74523 *3 | D6 = 0.438500 | |
| R7 = INFINITY | D7 = 0.350800 | N4 = 1.517120 |
| R8 = INFINITY | D8 = 1.266319 | |

*1 Aspherical Surface K = 0.0, A = 0.699749E-02, B = −0.191211E-03, C = −0.121897E-04
*2 Aspherical Surface K = 0.0, A = −0.379525E-01, B = −0.462606E-01, C = 0.962347E-02
*3 Aspherical Surface K = 0.0, A = 0.557427E-01, B = 0.185043E-01, C = 0.320782E-01

Assuming that the optical axis extends along an x-axis, a y-axis is vertical to the x-axis, the paraxial radius of curvature is R, and the height from the optical axis is H, the displacement X of the optical axis from the reference vertex point O of an aspherical lens is expressed by:

$$X = \frac{H^2/R}{1 + \sqrt{1 - (K+1)H^2/R^2}} + AH^4 + BH^6 + CH^8$$

where K is a conical constant and A, B, and C are aspherical coefficients.

FIGS. 4 to 9 show spherical aberration, astigmatism, and distortion in each different wide-angle lens assembly of the viewing angles from 70° to 120°. The reference numeral S and T represent a sagittal surface and a meridional surface, respectively.

It is understood that the horizontal viewing angle of the wide-angle lens assembly is arbitrarily determined within a range between the minimum and the maximum degree although its degrees in this embodiment are set at equal intervals of 10°.

As set forth above, the wide-angle lens assembly of the present invention permits the second lens to be commonly used in all lens groups from the minimum to the maximum horizontal viewing angle and the first lens to be commonly used in the lens groups from the reference angle to the maximum horizontal viewing angle, thus reducing the overall number of lenses yet being able to correct aberrations through satisfying the required conditions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A wide angle lens system comprising:
a combination of a first lens and a second lens which are respectively selected from a first group of discrete bi-concave lenses which have an aspherical surface on one face thereof and are fabricated respectively corresponding to each of horizontal viewing angles covered by the wide-angle lens system, and from a second group of identical bi-convex lenses which are provided with aspherical surfaces on both faces thereof and are fabricated respectively corresponding to each of horizontal viewing angles covered by the wide-angle lens system, said first lens and said second lens being aligned along an optical axis from an object side to an image side such that the first lens is positioned on the object side with respect to the second lens, the aspherical surface of the first lens being faced to the object side, wherein:
the combination of the first lens and the second lens provides a wide angle view and satisfies the following conditions:
$0.65f2 < bf < 0.8f2$
$-1.8f2 < -1.1f2$, and
where f1 is a focal distance of the first lens, f2 is a focal distance of the second lens, and bf is a distance of back focus from the second lens to a focus point thereof in each discrete combination of the first lens and the second lens.

2. A wide-angle lens system comprising:
a combination of a first lens, a second lens, and a third lens which are respectively selected from a first group of identical bi-concave lenses that have an aspherical surface on one face thereof and are fabricated respectively corresponding to each of horizontal viewing angles covered by the wide-angle lens system, a second group of identical bi-convex lenses which are provided with aspherical surfaces on both faces thereof and are fabricated respectively corresponding to each of horizontal viewing angles, and a third group of discrete negative meniscus lenses which are fabricated respectively corresponding to each of horizontal viewing angles, the first, second, and third lenses being aligned along an optical axis from an object side to an image side such that said third lens is positioned on the object side in relation to the first lens, with a convex face of the third lens facing to the object side and concave face thereof to the image side, whereas said second lens is positioned on the image side in relation to the first lens, the aspherical surface of the first lens being faced to the object side, wherein the combination of the first, second, and third lenses satisfies the following conditions:
$0.65f2 < bf < 0.8f2$
$-1.8f2 < f1 < -1.1f2$
$-14.0f2 < f0 < -5.5f2$
where f0 is a focal distance of the third lens, f1 is a focal distance of the first lens, f2 is a focal distance of the second lens, and bf is a distance of back focus from the second lens to a focus point thereof in each discrete combination of the first, second and third lenses.

3. A method of fabricating lens systems which cover individual segments of a horizontal viewing angle ranging from 70° to 120°, wherein:
from viewing angle of 70° to a first prescribed viewing angle, the lens system comprises a combination of two lenses which are respectively selected from a first lens group and a second lens group, whereas:
from a second prescribed viewing which is greater than said first prescribed viewing angle to a viewing angle of 120°, the lens system comprises a combination of three lenses which are respectively selected from the first lens group, the second lens group, and a third lens group, comprising the steps of:
fabricating lenses of the first lens group respectively corresponding to individual segments of the viewing angle, said lenses being bi-concave lenses and having an aspherical surface on one side thereof;
fabricating lenses of the second lens group respectively corresponding to individual segments of the viewing angle, said lenses being bi-concave lenses and having aspherical surfaces on both sides thereof;
fabricating lenses of the third lens group respectively corresponding to individual segments of the viewing angle, said lenses being discrete negative meniscus lenses;
constructing lens systems corresponding to each individual segment of the horizontal viewing angle from the viewing angle of 70° to said first prescribed viewing angle by combining a fit lens and a second lens respectively selected from the first lens group and the second lens group, and by arranging said first and second lenses along an optical axis from an object side to an image side such that said first lens is positioned on the object side in relation to the second lens, with the aspherical surface of the first lens facing to the object side, wherein:
the second lens is an identical type in any of the lens systems corresponding to each of the horizontal viewing angles, and
the combination of the first lens and the second lens satisfy the following conditions:
$0.65f2 < bf < 0.8f2$
$-1.8f2 < f1 < -1.1f2$,
where f1 is a focal distance of the first lens, f2 is a focal distance of the second lens, and bf is a distance of back focus from the second lens to a focus point thereof in each discrete combination of the first and second lenses; and
constructing lens systems corresponding to each individual segment of the horizontal viewing angle from said second prescribed viewing angle to the viewing angle of 120° by combining a fist lens, a second lens, and a third lens, respectively selected from the first lens group, the second lens group, and the third lens group, and by arranging the first, second, and third lenses along the optical axis from the object side to the image side such that the third lens is positioned on the object side in relation to the first lens, with a convex side of the third lens facing to the object side and a concave side thereof to the image side, whereas the second lens is positioned on the image side in relation to the first lens, the aspherical surface of the first lens being faced to the object side, wherein:

the second lens is of the same type as the second lens that is used in the lens systems of two-lens combination corresponding to each of the horizontal viewing angles from 70° to the first prescribed viewing angle, as well as is common to all of the lens systems corresponding to each of the horizontal viewing angles from the second prescribed viewing angle to the viewing angle of 120°;

the first lens is of the same type as the first lens that is used in the lens system of two-lens combination for covering said first prescribed viewing angle, as well as is common to all of the lens systems corresponding to each of the horizontal viewing angles from the second prescribed viewing angle to the viewing angle of 120°;

the combinations of the first, second, and third lenses satisfy the following conditions:

$0.65f2 < bf < 0.8f2$ $-1.8f2 < f1 < -1.1f2$ $-14.0f2 < f0 < -5.5d2$, where f0 is a focal distance of the third lens.

* * * * *

UNITED STATES PATENT AND TRADEMARK OFFICE
CERTIFICATE OF CORRECTION

PATENT NO. : 6,018,425
DATED : January 25, 2000
INVENTOR(S) : Koki Nakabayashi

It is certified that error appears in the above-identified patent and that said Letters Patent is hereby corrected as shown below:

On the cover page, [75] Assignee, delete "Ishihara" and insert:

--Matsushita Electric Industrial Co., Ltd.--.

Signed and Sealed this

Sixteenth Day of January, 2001

Attest:

Q. TODD DICKINSON

*Attesting Officer*           *Commissioner of Patents and Trademarks*

UNITED STATES PATENT AND TRADEMARK OFFICE
CERTIFICATE OF CORRECTION

PATENT NO. : 6,018,425
DATED : January 25, 2000
INVENTOR(S) : Koki Nakabayashi et al. et al.

It is certified that error appears in the above-indentified patent and that said Letters Patent is hereby corrected as shown below:

On the cover page, under [73] Assignee: Delete "Ishihara, Japan" and insert
--Matsushita Electric Industrial Co., Ltd.--.

Signed and Sealed this

Twenty-seventh Day of March, 2001

Attest:

NICHOLAS P. GODICI

Attesting Officer

Acting Director of the United States Patent and Trademark Office